US008794946B2

(12) United States Patent
Oneda et al.

(10) Patent No.: US 8,794,946 B2
(45) Date of Patent: Aug. 5, 2014

(54) COMPRESSION MOLDING MACHINE

(75) Inventors: Yoshitsugu Oneda, Kyoto (JP); Hidehiro Nihei, Kyoto (JP)

(73) Assignee: Kikusui Seisakusho, Ltd., Kyoto-Shi, Kyoto (JP)

( * ) Notice: Subject to any disclaimer, the term of this patent is extended or adjusted under 35 U.S.C. 154(b) by 19 days.

(21) Appl. No.: 13/548,107

(22) Filed: Jul. 12, 2012

(65) Prior Publication Data

US 2013/0029000 A1 Jan. 31, 2013

(30) Foreign Application Priority Data

Jul. 29, 2011 (JP) ................................ P2011-167389

(51) Int. Cl.
*B29C 43/08* (2006.01)

(52) U.S. Cl.
USPC ................ 425/78; 425/256; 425/345; 141/71

(58) Field of Classification Search
USPC ............................... 425/78, 256, 345; 141/71
See application file for complete search history.

(56) References Cited

U.S. PATENT DOCUMENTS 5,858,415 A * 1/1999 Bequette et al. ................ 425/78
7,976,300 B2 7/2011 Matthes et al.
8,167,598 B2 5/2012 Kraemer
8,419,410 B2 * 4/2013 Pollard ......................... 425/345
2010/0015272 A1 1/2010 Matthes et al.

FOREIGN PATENT DOCUMENTS

| | | | |
|---|---|---|---|
| DE | 10 2008 001 372 | A1 | 10/2009 |
| JP | H-1-224200 | A | 9/1989 |
| JP | 3052283 | U | 9/1998 |
| JP | 2009-536590 | A | 10/2009 |
| WO | WO 2007/131906 | A2 | 11/2007 |
| WO | WO 2008/101598 | A1 | 8/2008 |

OTHER PUBLICATIONS

European Search Report dated Sep. 3, 2013.

* cited by examiner

*Primary Examiner* — Joseph S Del Sole
*Assistant Examiner* — Thukhanh Nguyen
(74) *Attorney, Agent, or Firm* — McGinn IP Law Group, PLLC

(57) ABSTRACT

A compression molding machine includes a feeder that has a feeder main body, a sealing frame attached to the feeder main body and having a supply port allowing a powdery material to pass therethrough, a first elastic member comprised between the sealing frame and the feeder main body, a sealing member attached to the sealing frame and preventing the powdery material from leaking, and a second elastic member comprised between the sealing member and the sealing frame.

18 Claims, 9 Drawing Sheets

COMPRESSION MOLDING MACHINE

BACKGROUND

As disclosed in Japanese Registered Utility Model Publication No. 3052283 and the like, in a compression molding machine including a die table having at least one die bore, an upper punch and a lower punch retained respectively above and below the die table so as to be slidable upward and downward, a compression mechanism for compressing and molding a powdery material filled in the die bore by means of the upper punch and the lower punch, and a feeder for receiving and guiding the supplied powdery material into the die bore, conventionally, the feeder is often comprised with a groove that allows the powdery material to be supplied into the die bore, and the groove is surrounded with a sealing material that prevents or suppresses leaking of the powdery material.

In the configuration disclosed in Japanese Registered Utility Model Publication No. 3052283, the sealing material is attached directly to a bottom plate that defines a bottom surface of the feeder. However, in this configuration, there may be formed a gap between the sealing material and the die table comprised with the die bore due to improper attachment of the sealing material or abrasion of the sealing material. In such a case, the powdery material may leak out of the feeder through the gap.

Such improper attachment of the sealing material occurs in cases where the sealing material biases the die table with various degrees of strength in different regions, as well as where there is formed a gap between the die table and the sealing material. The improper attachment may occur because, for example, the sealing material is slightly waved in some cases in the groove that has a width equal to that of the sealing material, even though the sealing material is intended to be properly fitted into the groove.

The sealing material needs to be attached properly to the bottom plate upon replacement of the sealing material. However, in the configuration disclosed in Japanese Registered Utility Model Publication No. 3052283, the sealing material is attached directly to the bottom plate that defines the bottom surface of the feeder. It is thus uneasy to attach the sealing material properly. Accordingly, there are demands for attaching a sealing material so as not to form any gap between a die table and the sealing material, and for facilitating replacement of the sealing material.

On the other hand, as disclosed in Japanese Published Patent Publication No. 2009-536590 and the like, there has been known a compression molding machine of this type configured such that a sealing device provided between a feeder and a die table has at least one element defining an outline of a supply port. Furthermore, there is disclosed a pellet molding machine including a profile ring that applies, to the element, force toward the die table. However, because the element is attached to a base body of the feeder only by means of the profile ring, the attachment state thereof is insufficient. Moreover, no sealing material is provided between the element and the die table, so that sealing property is insufficient and a powdery material leaks through a gap between the element and the die table.

SUMMARY OF THE INVENTION

It is an object of the invention to suppress a powdery material from leaking out of a feeder though a gap between a die table and a sealing material even in a case where the sealing material is attached improperly, as well as facilitate replacement of the sealing material.

According to the invention, a compression molding machine includes a die table having at least one die bore, an upper punch and a lower punch retained respectively above and below the die table so as to be slidable upward and downward, a compression mechanism for compressing and molding a powdery material filled in the die bore by means of the upper punch and the lower punch, and a feeder for receiving and guiding the supplied powdery material into the die bore. The feeder includes a feeder main body, a sealing frame attached to the feeder main body and having a supply port allowing the powdery material to pass therethrough, a first elastic member comprised between the sealing frame and the feeder main body, a sealing member attached to the sealing frame and preventing the powdery material from leaking, and a second elastic member comprised between the sealing member and the sealing frame.

In the above configuration, the sealing member is attached to the sealing frame with the second elastic member being interposed therebetween, and the sealing frame is attached to the feeder main body with the first elastic member being interposed therebetween. Therefore, the sealing member is unlikely to be attached improperly. Even when the sealing member is attached improperly or the sealing member is abraded, the first elastic member adjusts the position of the sealing frame, and the sealing member is securely pressed against the die table. Therefore, the powdery material is reliably prevented from leaking. The sealing member can be attached or detached by elastically deforming the second elastic member or by detaching the second elastic member, thereby facilitating replacement of the sealing member. Furthermore, elastic force of the first elastic member suppresses abrasion of the sealing member.

In addition, force fastening the sealing member to the sealing frame is preferably adjustable by adjusting the elastic force of the second elastic member. Similarly, biasing force pressing the sealing frame against the die table is preferably adjustable by adjusting the elastic force of the first elastic member. Alternatively, there may be comprised a plurality of elastic members. The first elastic member may be located only at a side surface of the feeder in a travel direction toward a turret.

As an exemplary configuration that facilitates maintenance of the sealing frame, the sealing frame may be detachable from the feeder main body. In such a configuration, when the sealing frame is detached from the feeder main body, the sealing member can be replaced easily. It is noted that the sealing frame is applicable to a supply port having any shape.

As an exemplary configuration that facilitates adjustment of the elastic force of the elastic member to be applied to the sealing member or the sealing frame, each of the first and second elastic members may have a hollow tubular shape. Although such a hollow tube can exert sufficient effects by itself, preferably, fluid such as air is additionally injected into the hollow tube. In this case, the biasing force pressing the sealing frame against the die table or the fastening force applied between the sealing member and the sealing frame can be adjusted by adjusting the volume of the injected fluid.

In a case where the sealing member is made of resin, powdery metal is not mixed into a product even when the sealing member is abraded.

The powdery material in the invention refers to an aggregate of minute solids and includes an aggregate of particles such as what they call granules and an aggregate of powder smaller than the particles. The sealing frame is a member attached to the feeder main body, and has a supply port that allows the powdery material in the feeder to be supplied into the die bore. The sealing member is attached to this sealing frame.

DESCRIPTION OF THE PREFERRED EMBODIMENTS

Described below is a first embodiment of the present invention with reference to FIGS. 1 to 9.

Figure 1:
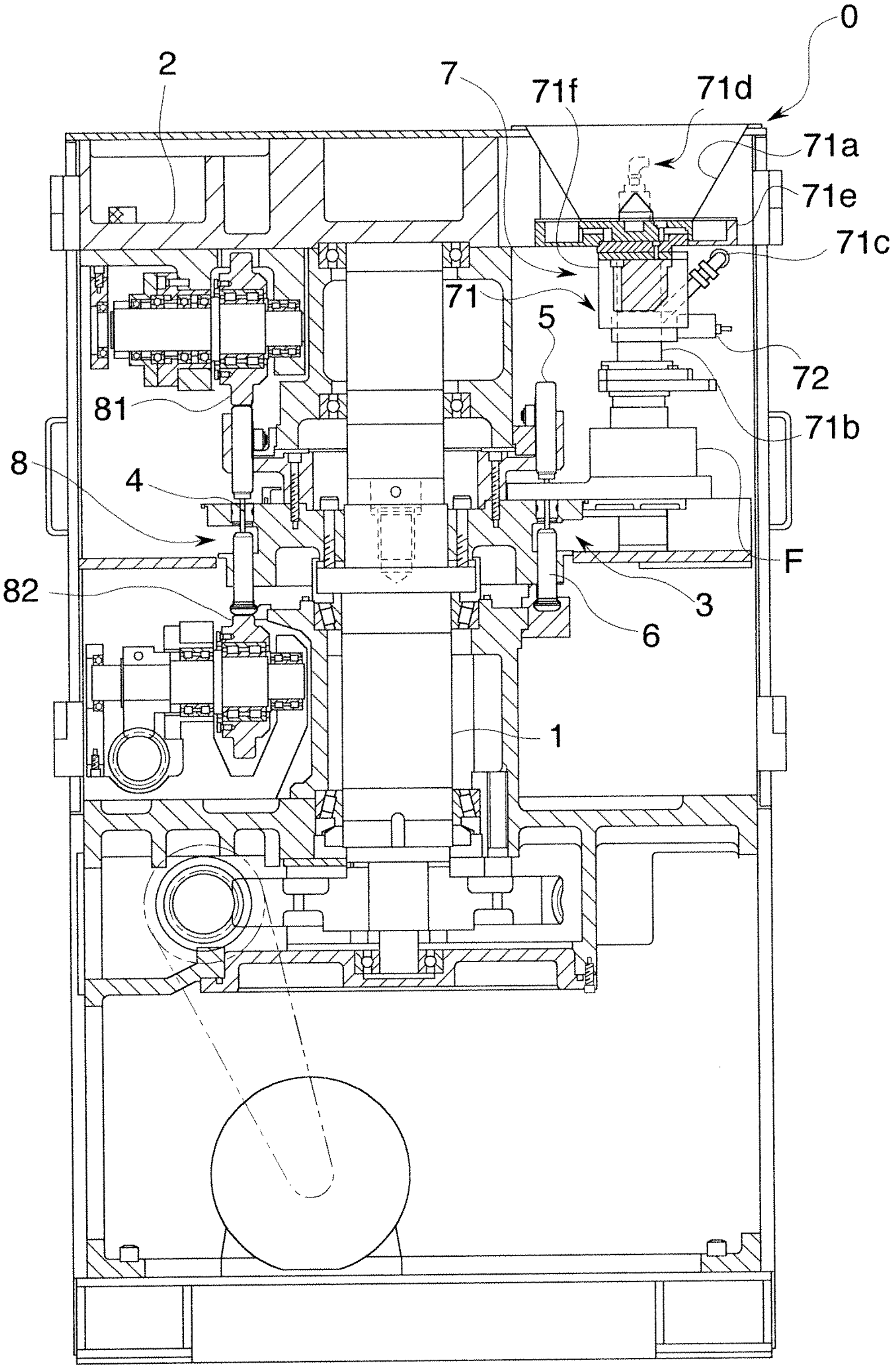
FIG. 1 is a front sectional view showing an entire compression molding machine according to an embodiment of the present invention.
Figure 2:
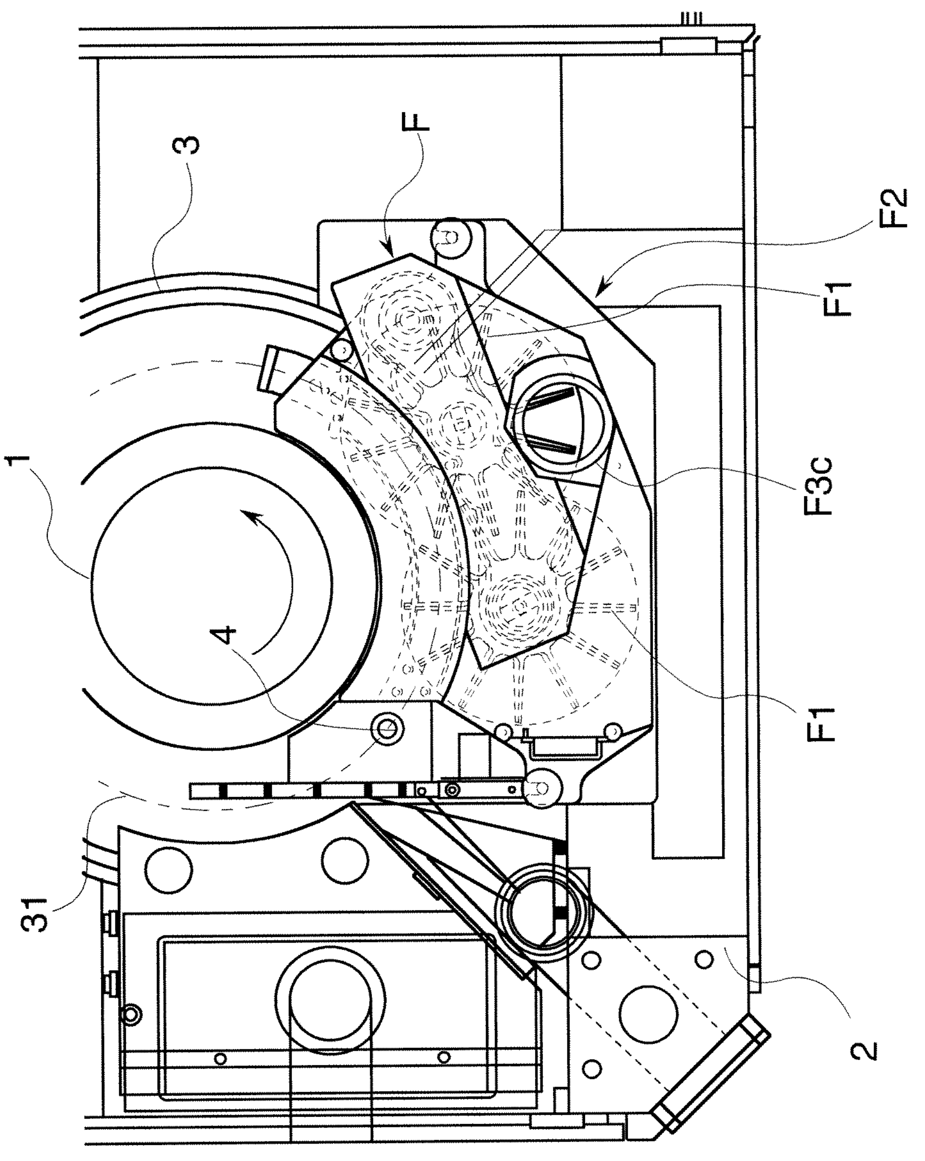
FIG. 2 is a plan view partially showing an attachment state of a feeder according to the embodiment.

As shown in FIGS. 1 and 2, a rotary compression molding machine 0 includes an upright shaft 1, a frame 2, a turret 3, an upper punch 5, and a lower punch 6. The turret 3 serving as a die table is mounted to the upright shaft 1 in the frame 2 so as to be horizontally rotatable therein. The turret 3 is provided, at a predetermined pitch, with at least one die that has a die bore 4. The upper punch 5 and the lower punch 6 are retained respectively above and below each die bore 4 so as to be vertically slidable. The rotary compression molding machine 0 also includes a compression mechanism 8 for compressing and molding a powdery material filled in the die bore 4 by the upper punch 5 and the lower punch 6. The rotary compression molding machine 0 further includes a supply system 7 for filling the powdery material in the die bore 4. The supply system 7 is mounted so as to supply the powdery material from above the turret 3 toward a die table 31. There is provided, at a lower end of the supply system 7, an agitating feeder F that fills the powdery material in the die bore 4. This agitating feeder F is disposed so as to be pressed downward toward the die table 31.

The upright shaft 1, the frame 2, the turret 3, the die bore 4, and the upper punch 5 and the lower punch 6, as well as a mechanism for guiding the upper and lower punches 5 and 6, a mechanism for ejecting a molded product, a mechanism for rotating the upright shaft 1, and the like are basically configured similarly to those well known in the art. Therefore, these components will not be detailed herein.

As shown in FIGS. 1 and 2, the supply system 7 guides the powdery material supplied into a hopper 71*a* to the agitating feeder F. The supply system 7 includes a supply mechanism 71. The supply mechanism 71 supplies the powdery material in the hopper 71*a* to a supplying pipe 71*b*. The supply mechanism 71 may be exemplified by a volumetric feeding device 71*e* that is provided with a detachable motor 71*f*. Due to provision of the volumetric feeding device 71*e*, a volumetric feeding rotor is rotated by the motor 71*f*, and the powdery material is supplied from the hopper 71*a* to the supplying pipe 71*b*. The hopper 71*a* is in communication with the supplying pipe 71*b* by way of the volumetric feeding device 71*e*, and is located at an upper end of the supplying pipe 71*b*. The supplying pipe 71*b* guides the powdery material discharged from the hopper 71*a* to the agitating feeder F.

The compression mechanism 8 is also basically configured similarly to those well known in the art. As shown in FIG. 1, the compression mechanism 8 includes paired pre-compression rolls configured by a pre-compression upper roll 81 and a pre-compression lower roll 82, as well as paired main compression rolls configured by a main compression upper roll and a main compression lower roll (none of which being shown). In a state where distal ends of the upper punch 5 and the lower punch 6 are inserted into the die bore 4, the powdery material filled in the die bore 4 is compressed and molded while passing between the pre-compression upper roll 81 and the pre-compression lower roll 82, and then between the main compression upper roll and the main compression lower roll (none of which being shown). The upper rolls and the lower rolls configuring the compression mechanism 8 are located around the upright shaft 1 and respectively above and below the turret 3.

Figure 3:
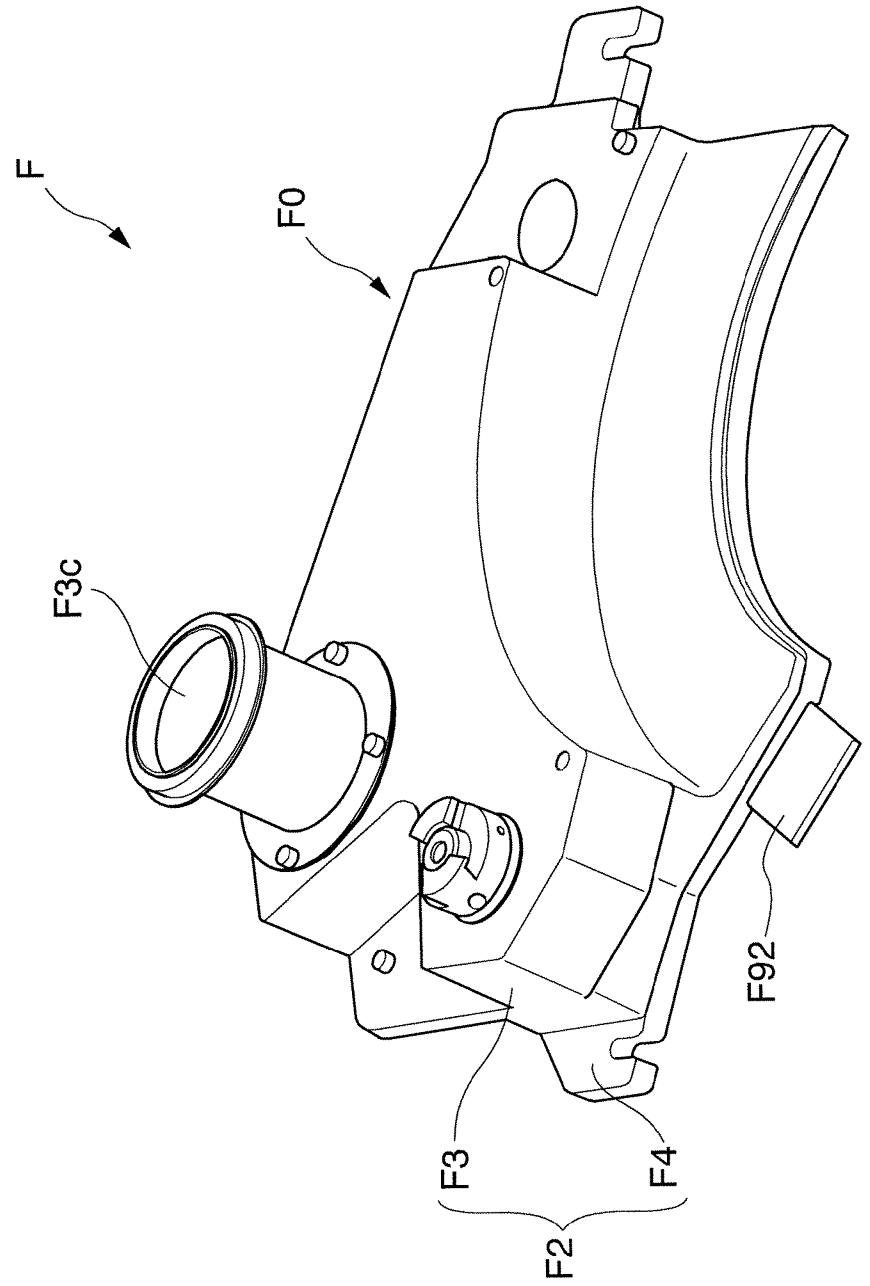
FIG. 3 is a perspective view entirely showing the feeder according to the embodiment.

The agitating feeder F fills the powdery material in a space formed by the die bore 4 and the lower punch 6. The powdery material filled therein is leveled by a leveling plate F92, and is then compressed and molded by the upper punch 5 and the lower punch 6, as described earlier. As shown in FIGS. 2 and 3, the agitating feeder F includes paired agitating rotors F1, a feeder main body F0, a sealing frame F5, a first elastic member F6, a sealing member F7, and a second elastic member F8. The paired agitating rotors F1 rotate in directions opposite to each other to agitate the powdery material on the turret 3. The feeder main body F0 has the agitating rotors F1 and a housing F2 that accommodates the agitating rotors F1. The sealing frame F5 is attached to the feeder main body F0 and has a supply port that allows the powdery material to pass therethrough. The first elastic member F6 is comprised between the sealing frame F5 and the feeder main body F0. The sealing member F7 is attached to the sealing frame F5 and prevents the powdery material from leaking out of the agitating feeder F. The second elastic member F8 is comprised between the sealing member F7 and the sealing frame F5.

As shown in FIG. 2, the agitating rotors F1 each have an attachment flange and a plurality of, twelve for example, blades. Each of the agitating rotors F1 is configured such that the blades, which are identical in length, extend radially from the attachment flange located at the center. Each of the agitating rotors F1 is driven by a gear that receives drive power transmitted from a motor by way of a gear train (not shown). The agitating rotors F1 are accommodated in a bottom space that is formed by a housing main body F3 configuring the housing F2 and a bottom plate member F4 attached to a bottom surface of the housing main body F3. The agitating rotors F1 are located substantially in the center in the longitudinal direction of the agitating feeder F, with distal ends thereof being overlapped with each other so as not to hit each other during rotation thereof. The agitating rotors F1 are mounted above and in no contact with an upper surface of the bottom plate member F4 of the housing F2, in other words, such that the lower surfaces of the agitating rotors F1 are spaced apart from the upper surface of the bottom plate member F4.

As shown in FIG. 3, the housing F2 is assembled such that the bottom plate member F4 is detachably fixed to the bottom of the housing main body F3 by means of bolts. The housing main body F3 is comprised with a powdery material supply port F3*c* that allows the inner space of the housing F2 to be in communication with the supply system 7.

Figure 4:
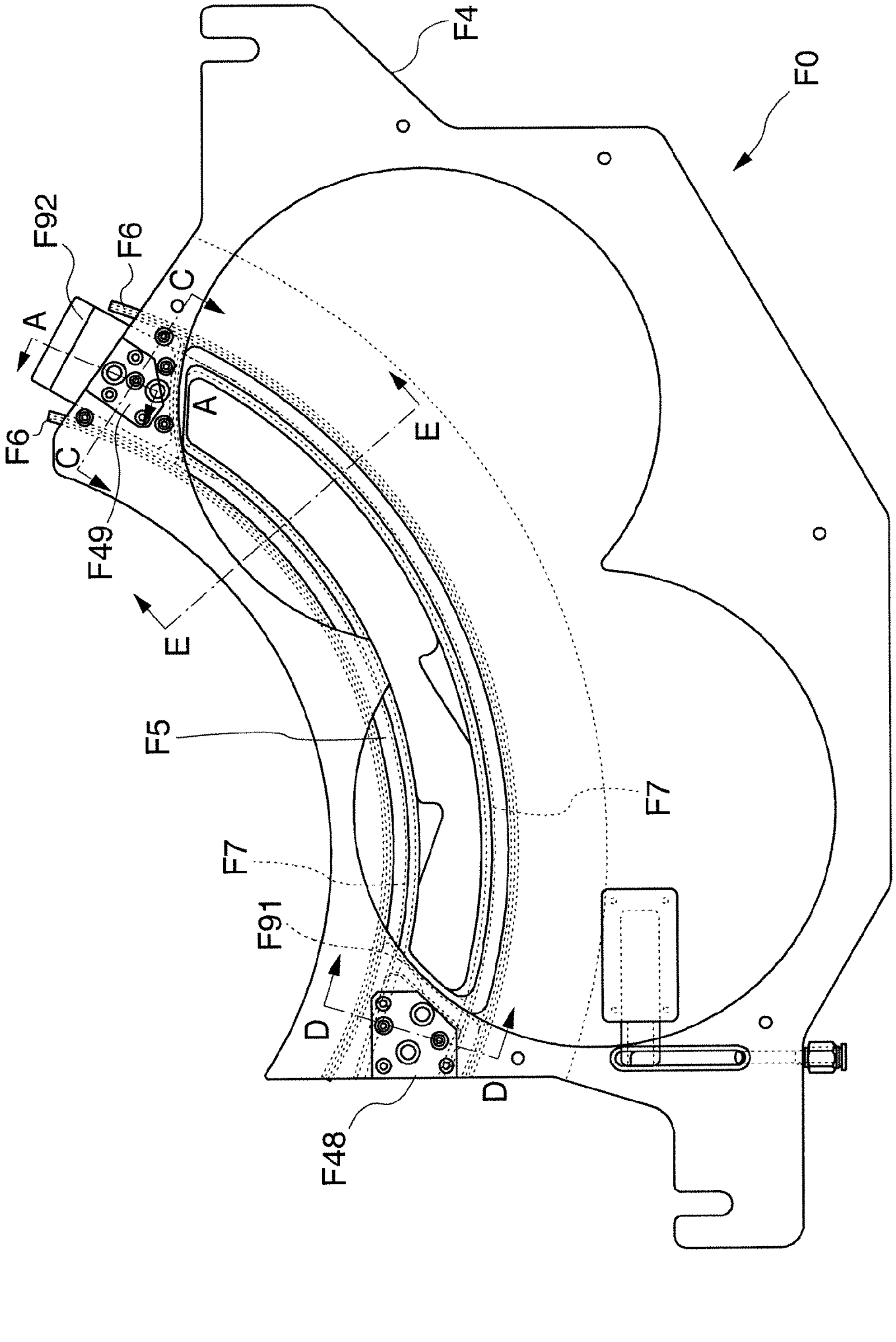
FIG. 4 is a plan view of a bottom plate of the feeder according to the embodiment.
Figure 8:
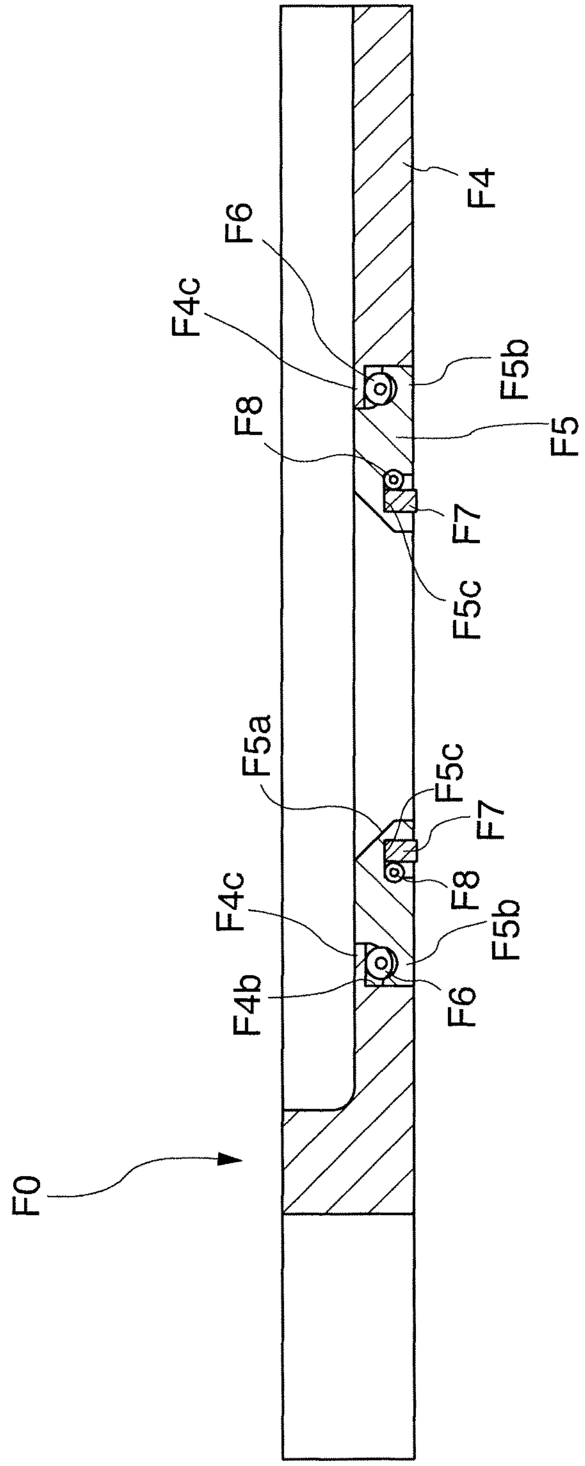
FIG. 8 is a sectional view taken along line E-E in FIG. 4.

The bottom plate member F4 is an element that configures the feeder main body F0. As shown in FIG. 4, the bottom plate member F4 has a flat disc shape and closes most of a lower opening. As shown in FIG. 8, the bottom plate member F4 is comprised with a groove F4*b* in a circular arc shape, at a position inside the die bore 4 in a state where the agitating feeder F is mounted at a predetermined mounting position. Furthermore, the groove F4*b* is comprised with projections F4*c* that are located at an inner peripheral edge and an outer peripheral edge of the groove F4*b* and project so as to come close to each other. As shown in FIG. 4, in the present embodiment, the sealing frame F5 is attached to the bottom plate member F4 with the first elastic member F6 being interposed therebetween, and the sealing member F7 is attached to the sealing frame F5 with the second elastic member F8 being interposed therebetween.

As shown in FIGS. 4 to 9, the sealing frame F5 is fitted into the groove F4*b* in the bottom plate member F4 so as to be detachable from the groove F4*b*. More specifically, the sealing frame F5 is comprised, at the center in the width direction thereof, with a supply port F5*a* that allows the powdery material to pass therethrough. The sealing frame F5 is also comprised, at the respective ends in the width direction thereof, with projections F5*b* that respectively face the projections F4*c* of the bottom plate member F4. The sealing frame F5 is comprised, in the lower surface thereof, with paired sealing grooves F5*c*. The paired sealing grooves F5*c* are located at positions apart by a predetermined distance from the respective edges in the width direction of the sealing frame F5, and allow the sealing member F7 to be fitted thereinto. There is comprised a backing plate F91 that is attached to the lower surface of the upstream edge of the sealing frame F5. There is also comprised the leveling plate F92 on the lower surface of the downstream edge of the sealing frame F5. The leveling plate F92 levels the powdery material filled in the die bore 4.

Figure 7:
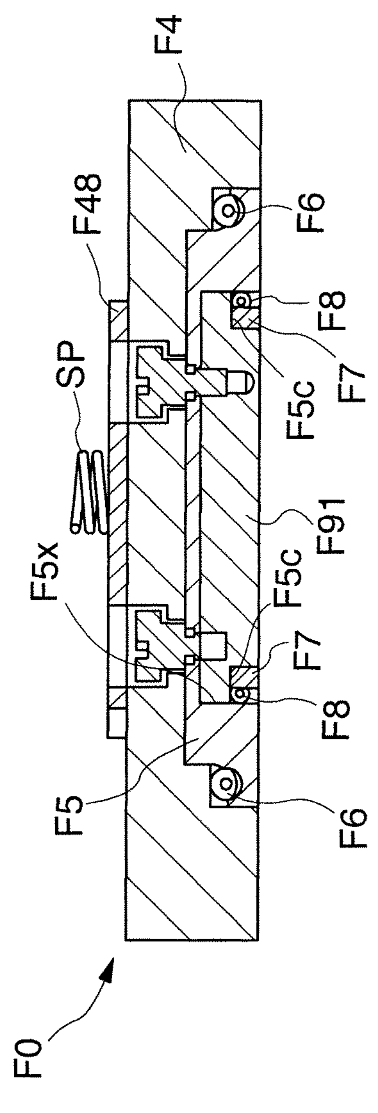
FIG. 7 is a sectional view taken along line D-D in FIG. 4.

As shown in FIG. 7, the backing plate F91 is accommodated in a backing plate fitting groove F5*x* that is comprised in the lower surface of the sealing frame F5. Also as shown in FIG. 7, the backing plate F91 is biased downward by a coil spring SP having an upper end that is supported by a first retainer plate F48 attached to the bottom plate member F4.

Figure 5:
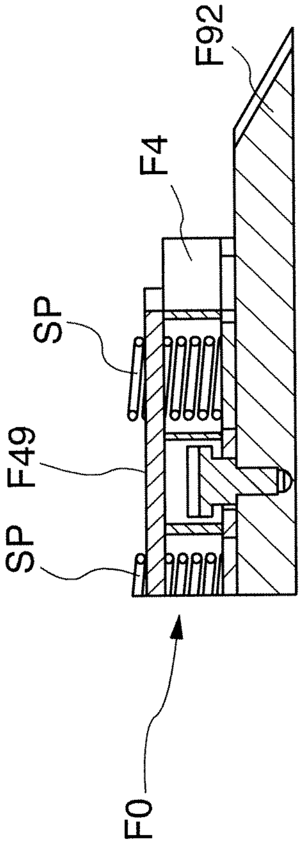
FIG. 5 is a sectional view taken along line A-A in FIG. 4.
Figure 6:
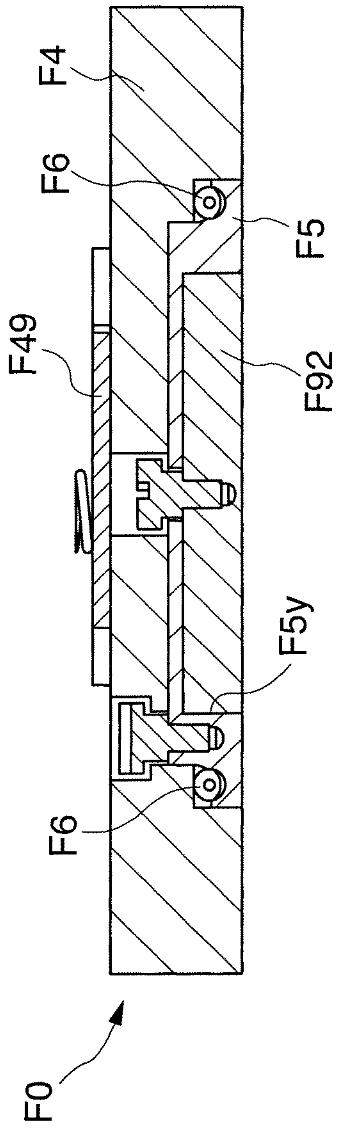
FIG. 6 is a sectional view taken along line C-C in FIG. 4.

As shown in FIGS. 5 and 6, the leveling plate F92 has a proximal end accommodated in a leveling plate fitting groove F5*y* that is comprised in the lower surface of the sealing frame F5, and a distal end projecting outward from the bottom plate member F4. As shown in FIG. 5, the distal end of the leveling plate F92 is formed to be gradually thinner toward the tip of the distal end. Also as shown in FIG. 5, the leveling plate F92 is biased downward by another coil spring SP having an upper end that is supported by a second retainer plate F49 attached to the bottom plate member F4.

As shown in FIGS. 4 and 8, the first elastic member F6 is located between each of the projections F4*c* of the bottom plate member F4 and corresponding one of the projections F5*b* of the sealing frame F5. The first elastic member F6 is made of resin and has a hollow tubular shape.

In the present embodiment, the first elastic member F6 is located only at a side surface of the agitating feeder F in the travel direction toward the turret 3. The first elastic member F6 has elastic force biasing downward the sealing frame F5.

As shown in FIGS. 4 and 8, there are comprised paired sealing members F7, which are located so as to face each other in the sealing grooves F5*c* comprised in the sealing frame F5. Each of the sealing members F7 is made of resin and has a rectangular shape in cross section.

As shown in FIGS. 4 and 8, the second elastic member F8 is located between each of the sealing members F7 and one of side walls of corresponding one of the sealing grooves F5*c* in the sealing frame F5. The second elastic member F8 is made of resin and has a hollow tubular shape. The second elastic member F8 has elastic force biasing the sealing member F7 toward the one of the side walls of the sealing groove F5*c*.

Fluid (more specifically, air, nitrogen, or the like) is injected into the hollow portions of the first elastic member F6 and the second elastic member F8. The fastening force between the sealing frame F5 and the bottom plate member F4 and the fastening force between the sealing member F7 and the sealing frame F5 are made adjustable by the fluid thus injected.

The sealing member F7 is replaced in the following manner. The second elastic member F8 is taken out of the sealing groove F5*c* in the sealing frame F5, and then the sealing member F7 is taken out of the sealing groove F5*c*. Subsequently, a new sealing member F7 is fitted into the sealing groove F5*c*. Then, the second elastic member F8 is comprised between the sealing member F7 and one of the side walls of the sealing groove F5*c* in the sealing frame F5, so that the sealing member F7 is fixed in position.

Figure 9:
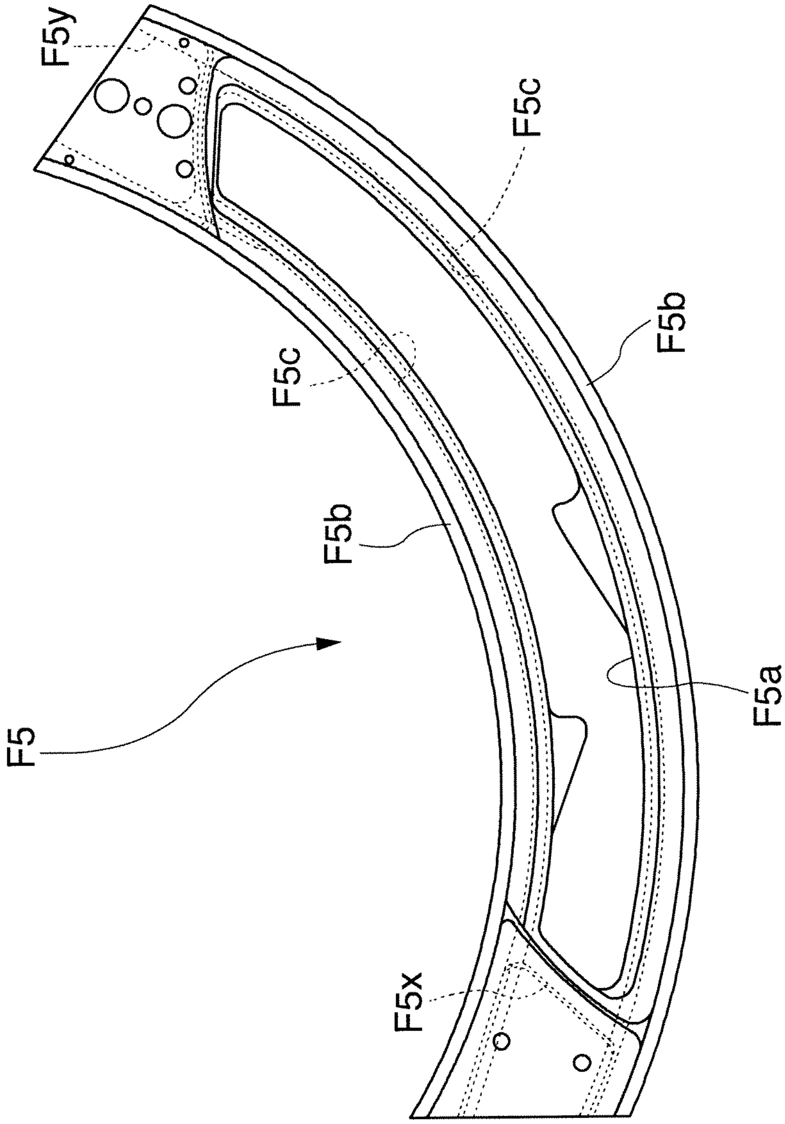
FIG. 9 is a plan view of a sealing frame according to the embodiment.

FIG. 9 is a plan view showing the state where the sealing frame F5 is detached from the bottom plate member F4 and the second elastic member F8 and the sealing member F7 are also detached.

As described above, the sealing frame F5 is attached to the feeder main body F0, more specifically, the bottom plate member F4, with the first elastic member F6 being interposed therebetween, and the sealing member F7 is attached to the sealing frame F5 with the second elastic member F8 being interposed therebetween. In this configuration, even in a case where the sealing member F7 is attached improperly, the sealing member F7 is securely pressed against the die table of the turret 3. Moreover, the sealing member F7 can be replaced easily.

The first elastic member F6 biases the sealing frame F5 toward the turret 3. Therefore, the sealing member F7 is more securely pressed against the die table of the turret 3, and the powdery material is prevented from leaking out of the agitating feeder F.

Furthermore, the first and second elastic members F6 and F8 each have the hollow tubular shape. Therefore, the elastic force applied to the sealing frame F5 or the sealing member F7 can be adjusted easily by changing the thickness or the diameter of the first elastic member F6 or the second elastic member F8.

Because the sealing member F7 is made of resin, powdery metal is not mixed into a product even when the sealing member F7 is abraded.

It is noted that the invention is not limited to the embodiment described above, but may be modified in various manners.

For example, the shape of each of the elastic members is not limited to the tubular shape, but may be a solid string shape. Still alternatively, there may be comprised a plurality of elastic members that each have a spherical shape or a spheroidal shape, and are located so as to be spaced apart from each other.

The sealing member is not necessarily made of resin, but may be made of a different material such as rubber.

Specific configurations of other respective portions are not limited to those in the embodiment either and the invention may be modified in various ways within a range not departing from the purposes thereof.

What is claimed is:

1. A compression molding machine, comprising:

a die table having at least one die bore;

an upper punch and a lower punch retained respectively above and below the die table so as to be slidable upward and downward;

a compression mechanism for compressing and molding a powdery material filled in the die bore by means of the upper punch and the lower punch; and a feeder for receiving and filling the supplied powdery material into the die bore, wherein the feeder includes:

a feeder main body, a sealing frame attached to the feeder main body and having a supply port allowing the powdery material to pass therethrough, a first elastic member formed between the sealing frame and the feeder main body, a sealing member attached to the sealing frame and preventing the powdery material from leaking, and a second elastic member formed between the sealing member and the sealing frame.

2. The compression molding machine according to claim 1, wherein the sealing frame is detachable from the feeder main body.

3. The compression molding machine according to claim 1, wherein each of the first and second elastic members has a hollow tubular shape.

4. The compression molding machine according to claim 1, wherein the sealing member comprises resin.

5. The compression molding machine according to claim 2, wherein each of the first and second elastic members has a hollow tubular shape.

6. The compression molding machine according to claim 2, wherein the sealing member comprises resin.

7. The compression molding machine according to claim 3, wherein the sealing member comprises resin.

8. The compression molding machine according to claim 5, wherein the sealing member comprises resin.

9. The compression molding machine according to claim 1, wherein the feeder main body includes a housing that accommodates agitating rotors, and wherein the agitating rotors are located substantially in a center in a longitudinal direction of the feeder.

10. The compression molding machine according to claim 1, wherein the feeder main body includes a housing having a bottom plate member and a housing main body, and wherein the sealing frame is attached to the bottom plate member with the first elastic member being formed between the sealing frame and the bottom plate member of the housing of the feeder main body.

11. The compression molding machine according to claim 9, wherein the sealing member comprises resin.

12. The compression molding machine according to claim 1, wherein the sealing frame includes paired sealing grooves located at positions apart by a predetermined distance in a width direction of the sealing frame, and wherein the sealing member is attached to the sealing frame via the paired sealing grooves of the sealing frame.

13. The compression molding machine according to claim 1, wherein the sealing member is attached to the sealing frame via a sealing groove of the sealing frame.

14. The compression molding machine according to claim 1, wherein the first elastic member has elastic force biasing the sealing frame downward.

15. The compression molding machine according to claim 12, wherein the second elastic member has elastic force biasing the sealing member toward a side wall of the sealing groove.

16. The compression molding machine according to claim 13, wherein the second elastic member has elastic force biasing the sealing member toward a side wall of the sealing groove.

17. The compression molding machine according to claim 1, wherein the first elastic member directly contacts the sealing frame and the feeder main body.

18. The compression molding machine according to claim 1, wherein the second elastic member directly contacts the sealing member and the sealing frame.

* * * * *